United States Patent [19]

Diekevers

[11] Patent Number: 5,022,718
[45] Date of Patent: Jun. 11, 1991

[54] IDLER WHEEL ASSEMBLY

[75] Inventor: Mark S. Diekevers, East Peoria, Ill.

[73] Assignee: Caterpillar Inc., Peoria, Ill.

[21] Appl. No.: 575,754

[22] Filed: Aug. 31, 1990

[51] Int. Cl.⁵ ............................................. B62D 55/14
[52] U.S. Cl. ......................................... 305/24; 305/28; 295/7; 295/11
[58] Field of Search ..................... 305/21, 23, 24, 25, 305/27, 28; 295/7, 8, 11; 152/5, 7, 17, 40, 47

[56] References Cited

U.S. PATENT DOCUMENTS

| Re. 30,039 | 6/1979 | Clemens et al. | 305/21 |
| 1,839,237 | 1/1932 | Lord | 295/7 X |
| 2,548,839 | 4/1951 | Coombes | 295/11 |
| 2,667,767 | 2/1954 | Burrell | 295/11 X |
| 3,057,219 | 10/1962 | Montgomery | 74/243 |
| 3,093,006 | 6/1963 | Gamaunt | 74/243 |
| 3,164,417 | 1/1965 | Howes | 305/32 |
| 3,290,737 | 12/1966 | Akiyama et al. | 295/11 X |
| 3,847,444 | 11/1974 | Aker | 301/66 DD |
| 3,979,154 | 9/1976 | Groff | 305/21 |
| 3,989,314 | 11/1976 | Reinsma et al. | 305/28 |
| 3,993,356 | 11/1976 | Groff et al. | 301/6 WB |
| 4,203,633 | 5/1980 | Hare | 305/28 |

FOREIGN PATENT DOCUMENTS 660606 11/1951 United Kingdom .................. 295/11

Primary Examiner—Russell D. Stormer
Attorney, Agent, or Firm—Claude F. White

[57] ABSTRACT

An idler wheel assembly for supporting and guiding an endless track chain assembly of a track-type vehicle includes a spoked idler wheel having a plurality of aligned apertures through the sidewalls. A resilient plug assembly is contained within each set of aligned apertures. A resilient pad isolates each plug assembly from the idler wheel. Conventional spoked idler wheels have a plurality of holes through the sidewalls. These holes collect debris which can damage the idler wheel or other undercarriage components. The subject idler wheel assembly includes resilient plug assemblies to close the apertures and maintain the sound reducing characteristics of the idler wheel assembly.

9 Claims, 2 Drawing Sheets

SECTION A-A

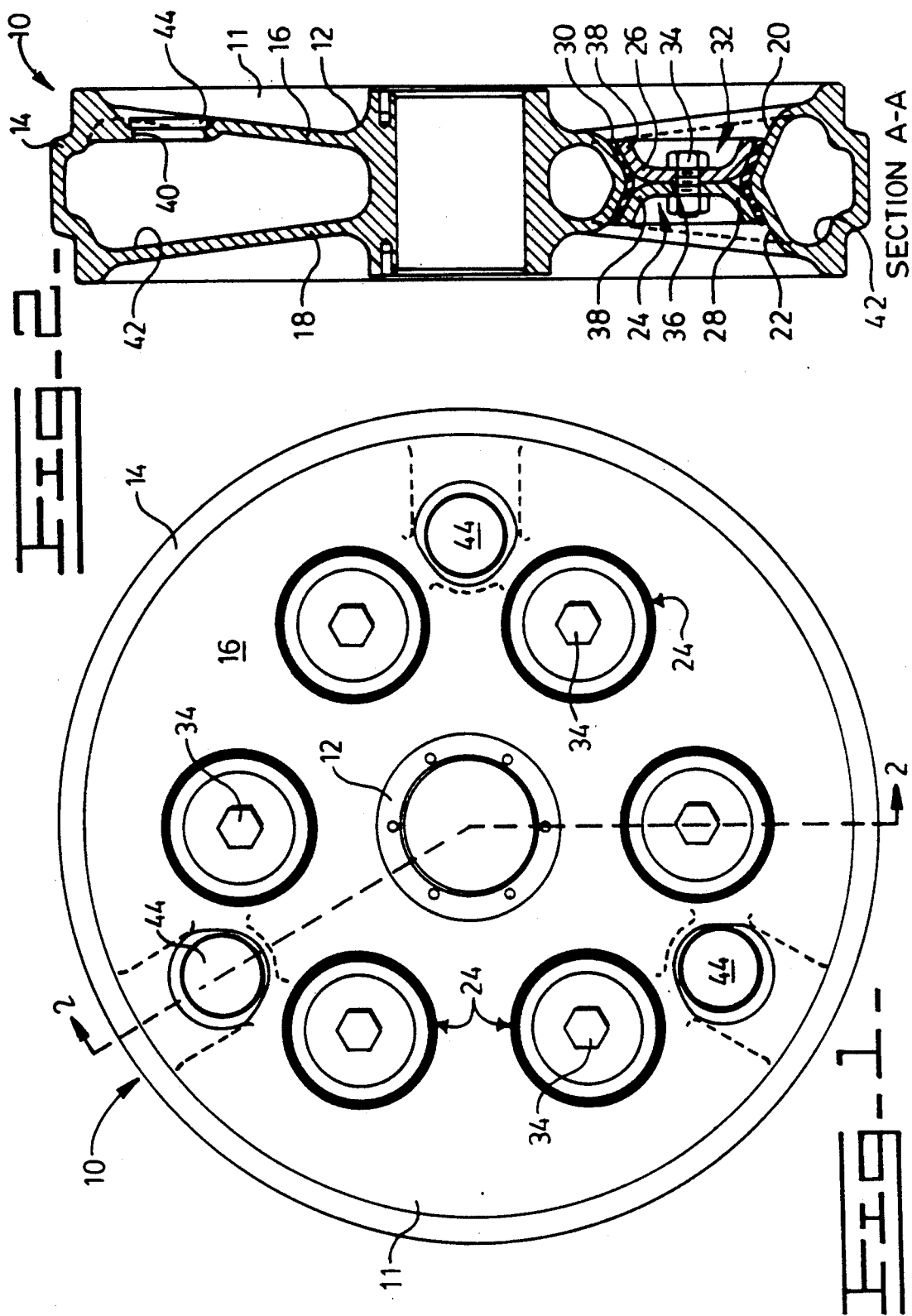

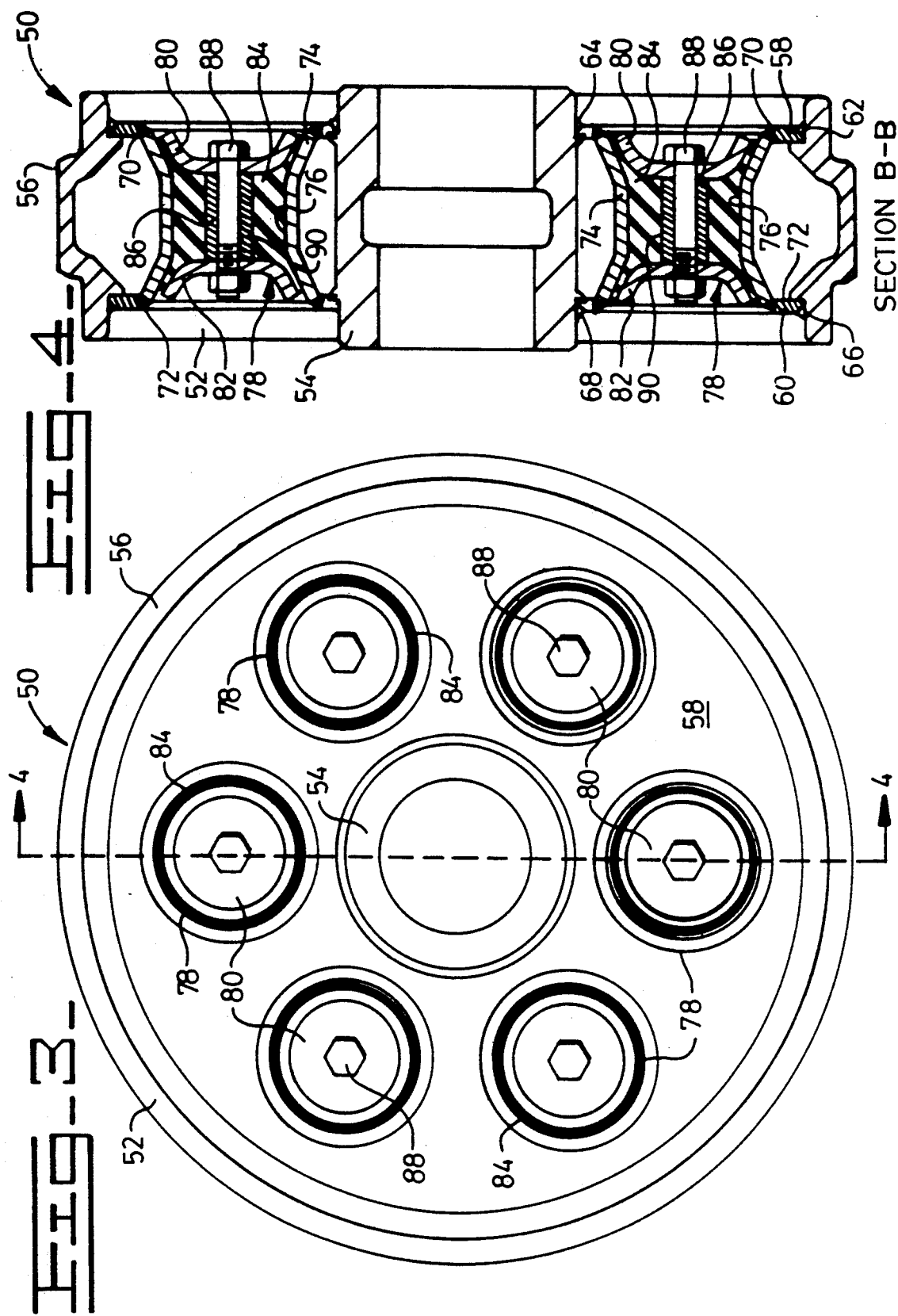

IDLER WHEEL ASSEMBLY

DESCRIPTION

1. Technical Field

This invention relates generally to an idler wheel assembly for a track-type vehicle and more particularly to a low noise generating idler wheel having a plurality of resilient hole plugging assemblies.

2. Background Art

Earthmoving and construction type vehicles, which utilize endless self-laying tracking chain assemblies for support and propulsion, generally include one or more large diameter idler wheels. The idler wheels guide and support portions of the track chain and reverses the direction of the track chain as it encircles the idler wheels. Because the track chains include metal connecting links which contact and impact against metal tread portions of the idler wheels during vehicle operations, considerable noise and vibration are generated by the metal to metal contact of the moving and engaging components. Several types of idler wheel constructions and treatments have been proposed in the past in an effort to alleviate the objectionable noise and vibrations.

One type of idler wheel having a plurality of radially extending spokes and convex surfaces on the annular rim portion is disclosed in U.S. Pat. No. 4,203,633, issued to R. B. Hare on May 20, 1980. In this patent, the convex surfaces of the idler wheel contact elastomeric inserts in the mating portions of the track assembly. Because of the convex surfaces, the contact area between the rim portions and the elastomeric inserts is relatively narrow and the compliance of the inserts when impacted by the rim portions is increased.

Another type of spoked idler wheel and drive wheel is disclosed in U.S. Pat. No. 3,093,006, issued to R. L. Gamaunt on June 11, 1963. In this patent, each of the idler and drive wheels has a plurality of tires which are adapted to engage corresponding rubber pads on the track.

Each of the above noted idler wheel assemblies would appear to provide some reduced noise levels during operation. However, each of the noted idler wheel assemblies have a plurality of enlarged transverse openings which would tend to collect debris. Such debris can damage the idler wheels or other components of the vehicle undercarriage.

The present invention is directed to overcoming one or more of the problems as set forth above.

DISCLOSURE OF THE INVENTION

In one aspect of the present invention, an idler wheel assembly includes a central hub portion, an annular rim portion, and first and second sidewall portions joining the hub portion to the rim portion, with each sidewall having a plurality of apertures therethrough. The idler wheel assembly further includes a plurality of resilient plug assemblies, with one plug assembly being positioned in each of the apertures. Each plug assembly includes a plurality of formed plates, a resilient pad, and means for securing the plates and pad together.

Self-laying track-type vehicles, which utilize endless track assemblies to support and propel the vehicle, generally include one or more large diameter idler wheels. The idler wheels guide portions of the track and serve to reverse the direction of the track as it encircles the idler wheels. As the idler wheel contacts the moving track components, noise and vibration are generated. In an effort to reduce the noise level, spoked idlers were used in place of idlers having solid side plates. However, the spoked idler wheels often produce another problem, which is the collection of debris in the openings between the spokes. The subject invention provides a reduced noise level idler wheel by utilizing a spoked idler with resilient plug assemblies closing the openings between the spokes. The noise reducing characteristics of the spoked idler wheel are therefore maintained and debris is prevented from entering the openings between the spokes.

BRIEF DESCRIPTION OF THE DRAWINGS

FIG. 1 is a diagrammatic side elevational view of an idler wheel incorporating the subject invention;

FIG. 2 is a diagrammatic sectional view taken generally along the lines 2—2 of FIG. 1;

FIG. 3 is a diagrammatic side elevational view of an alternate embodiment of the subject invention; and FIG. 4 is a diagrammatic sectional view taken generally along the lines 4—4 of FIG. 3.

BEST MODE FOR CARRYING OUT THE INVENTION

Referring to the drawings, and particularly to FIGS. 1 and 2, an idler wheel assembly 10, for guiding and carrying endless track chains of a track-type vehicle, includes an idler wheel 11 which has a central hub portion 12, an annular rim portion 14, and first and second side wall portions 16 and 18. The side wall portions 16,18 join the hub portion 12 to the rim portion 14. The first side wall portion 16 has a plurality of first through apertures 20 and the second side wall portion 18 has a plurality of second through apertures 22. The first and second apertures 20,22 are substantially equally spaced circumferentially about the hub portion 12. Each of the first apertures 20 aligns axially with one of the second apertures 22.

The idler wheel assembly 10 also includes a plurality of resilient plug assemblies 24, with one of the plug assemblies 24 adapted to be positioned in each set of aligned apertures 20,22. Each plug assembly 24 includes first and second formed plates 26,28, a resilient pad 30, and means 32 for securing the first plate 26 to the second plate 28. In the assembled condition of the resilient plug assemblies 24 in the apertures 20,22, one of the resilient pads 30 is adapted to be positioned between the first and second plates 26,28 and the idler wheel side wall portions 18,20. The securing means 32, which preferably includes threaded fasteners 34, also secures the resilient pad 30 between the first and second plates 26,28 and the side wall portions 18,20.

Each of the formed plates 26,28 is cup-shaped in cross-section and has a substantially planar base portion 36 and curved side portions 38. The curved side portions 38 extend outwardly from the base portion 36 and are adapted to contact the resilient pads 30 and secure the pads 30 between the curved side portions and the side wall portions 16,18 when the first plate 26 is secured to the second plate 28. The threaded fasteners 34 are adapted to penetrate the base portion 36 of each of the first and second formed plates 26,28.

The idler wheel 11 is preferably formed by a casting process which provides a single integral member of the hub portion 12, the rim portion 14, and the first and second side wall portions 16,18. The first and second apertures 20,28 are formed in the respective side walls 16,18 during the casting process. A plurality of holes 40 in the first side wall portion 16 are also formed during the casting process. An internal cavity 42 is formed within the idler wheel 11. A sound absorbing material, such as sand, can be inserted into the cavity 42 if desired. A plurality of cover plates 44 are adapted to close off the holes 40.

With particular reference to FIGS. 3 and 4, an alternate embodiment of an idler wheel assembly 50 includes a fabricated idler wheel 52 with plurality of individual members including a central hub portion 54, an annular rim portion 56, and first and second side wall portions 58,60, all joined together by a plurality of weld joints 62,64,66,68. The first side wall portion 58 has a plurality of first through openings 70 and the second side wall portion 60 has a plurality of second through openings 72. The first and second openings 70,72 are substantially equally spaced circumferentially about the hub portion 54. Each of the first openings 70 aligns axially with one of the second openings 72. A tubular member 74 is welded into each of the aligned openings 70,72 in the first and second side wall portions to define a plurality of through apertures 76.

A resilient plug assembly 78 is adapted to be positioned in each of the apertures 76. Each of the plug assemblies 78 includes first and second formed plates 80,82, a resilient pad 84, a cylindrical sleeve 86 positioned between the first and second formed plates 80,82, and a threaded fastener 88 for securing the first plate 80 to the second plate 82. Each of the resilient pads 84 is positioned between he plates 80,82 and is clamped between the plates 80,82 and the tubular member 74 when the threaded fastener 88 is tightened. Each resilient pad 84 has an aperture 90 therethrough and one of the cylindrical sleeves 86 is adapted to be positioned within the aperture 90. One of the threaded fasteners 88 is positioned within each of the cylindrical sleeves 86.

INDUSTRIAL APPLICABILITY

The subject idler wheel assembly 10 is particularly useful with earthmoving and construction type vehicles, and more specifically, track-type vehicles. Such vehicles utilize endless track chains which are supported and guided by the subject idler wheel assemblies 10. Contact between the metal track chains and the metal idler wheels 11 generates noise and vibration. This noise is often amplified by conventional idler wheels which have large side wall surface areas.

Spoked idler wheels have been utilized in an effort to reduce the amplifying of noise and vibration. However, the openings between the idler wheel spokes have created additional problems. When the vehicles having spoked idler wheels are employed in land clearing, trail blazing, and other earthmoving operations, tree limbs and other debris becomes lodged within the openings between the idler wheel spokes. This debris often damages the idler wheel and other undercarriage components.

The subject idler wheel assembly 10 utilizes a resilient plug assembly 24 secured within the idler wheel apertures to solve the problem. The resilient plug assemblies prevent debris from becoming lodged within the idler wheel 11 and the resilient pads 30 preserve the sound reducing qualities of the spoked idler wheels 11.

Other aspects, objects, and advantages of this invention can be obtained from a study of the drawings, the disclosure, and the appended claims.

I claim:

1. An idler wheel assembly for guiding and carrying endless track chains of a track-type vehicle, comprising:
    a central hub portion;
    an annular rim portion;
    first and second side-wall portions joining said hub portion to said rim portion, said side-wall portions having a plurality of aligned apertures therethrough, said apertures being substantially equally spaced circumferentially about said hub portion; and
    a plurality of resilient plug assemblies, one plug assembly positioned in each set of aligned apertures, said plug assemblies each including first and second plates, a resilient pad positioned between said plates and said idler wheel side wall portions, and means for securing said first plate to said second plate and for securing said pad between said plates and said side wall portions.

2. An idler wheel assembly, as set forth in claim 1, wherein said securing means includes a plurality of threaded fastening members.

3. An idler wheel assembly, as set forth in claim 1, wherein said plates are cup-shaped in cross-section and have a substantially planar base portion and curved side portions extending outwardly from said base portion, said side portions adapted to contact said resilient pads when said first plate is secured to said second plate.

4. An idler wheel assembly, as set forth in claim 3, wherein said securing means includes a plurality of threaded fastening members, one of said fastening members adapted to penetrate the base portion of each of said first and second plates.

5. An idler wheel assembly, as set forth in claim 1, wherein each of said plug assemblies includes a cylindrical sleeve, said cylindrical sleeve being positioned between said first and second plates.

6. An idler wheel assembly, as set forth in claim 5, wherein each of said resilient pads has an aperture therethrough and one of said cylindrical sleeves is positioned within said aperture.

7. An idler wheel assembly, as set forth in claim 5, wherein said securing means includes a plurality of threaded fastening members, one of said fastening members adapted to be positioned within each of the cylindrical sleeves.

8. An idler wheel assembly, as set forth in claim 1, wherein said means for securing said resilient pad between said plates and said side-wall portions includes curved side portions on said plates.

9. An idler wheel assembly, as set forth in claim 1, including a plurality of tubular members and wherein said hub portion, said rim portion, and said first and second side-wall portions are formed as individual members and are joined into a wheel assembly by welding, said apertures being defined by said tubular members which are welded into aligned openings in said first and second side-wall portions.

* * * * *